United States Patent [19]

Enkegaard

[11] Patent Number: 4,984,983
[45] Date of Patent: Jan. 15, 1991

[54] METHOD OF COFIRING HAZARDOUS WASTE IN INDUSTRIAL ROTARY KILNS

[75] Inventor: Torben Enkegaard, Valby, Denmark
[73] Assignee: F. L. Smidth & Co. A/S, Denmark
[21] Appl. No.: 307,631
[22] Filed: Feb. 7, 1989
[51] Int. Cl.$^5$ .............................................. F27B 15/00
[52] U.S. Cl. .................................... 432/14; 432/105; 432/106; 110/246
[58] Field of Search ................. 110/246; 432/105, 103, 432/106, 14

[56] References Cited

U.S. PATENT DOCUMENTS

| | | | |
|---|---|---|---|
| 3,842,762 | 10/1974 | Sargent et al. | 110/246 |
| 4,295,823 | 10/1981 | Ogawa et al. | 432/106 |
| 4,315,712 | 2/1982 | Seglias | 110/246 |
| 4,363,668 | 12/1982 | Herchenbach | 432/106 |
| 4,367,096 | 1/1983 | Wadia | 432/106 |
| 4,392,822 | 7/1983 | Brachthanser et al. | 432/106 |
| 4,640,681 | 2/1987 | Steinbiss et al. | 432/106 |
| 4,746,290 | 5/1988 | DeCicco et al. | 432/106 |

Primary Examiner—Henry C. Yuen
Attorney, Agent, or Firm—Brumbaugh, Graves, Donohue & Raymond

[57] ABSTRACT

A method and apparatus of cofiring hazardous organic waste in solid, pasty, greasy or sludge form by introducing it directly into the burning zone of an industrial rotary kiln and burning the waste in the burning zone simultaneously with cement, lime or lightweight aggregate. Specifically disclosed are five exemplary embodiments for introducing the waste directly into the burning zone of the kiln, i.e., (1) through a side opening in the kiln, (2) ballistically, (3) by pre-mixing with a powder or granular material and pneumatically injecting the non-sticky mixture, (4) by shredding steel drums containing the waste and thereafter separating the drum fragments and mixing the remaining waste with powder or granular material (i.e. as in (3) and (5) by pregasification of the waste.

13 Claims, 7 Drawing Sheets

Fig. 1A

1. Calciner
2. Damper
3. By-pass
4. Dividing gate

METHOD OF COFIRING HAZARDOUS WASTE IN INDUSTRIAL ROTARY KILNS

BACKGROUND OF THE INVENTION

Growing environmental concern makes it more and more difficult to dispose of hazardous waste in direct land-filling, by storage in surface impoundments, by deep well injection, by dumping or simple burning off at sea.

It is therefore expected that in the future, incineration or thermal oxidation at high temperature will play an increasing role as an environmentally acceptable way of destroying hazardous organic waste.

Incineration is an engineered process that employs thermal decomposition via thermal oxidation at high temperature (normally 900° C./1650° F. or greater) to destroy the organic fraction of waste and reduce volume. Generally, combustible wastes or wastes with high organic content are considered most appropriate for incineration. However, technically speaking, any waste with a hazardous organic fraction, no matter how small, is at least a functional candidate for incineration. For instance, significant amounts of contaminated water are currently incinerated in the United States. Contaminated soils are also being incinerated with increasing frequency.

The minimum temperature required for incineration ranges from 875° C./1610° F. for incineration of municipal garbage, to 1400° C./2550° F. for the incineration of the most stable organic components such as PCB, dioxin, DDT and residues from the production of polyvinyl halogenides. The residence time at the high temperature should be at least 2 seconds.

A separate technology, that of producing cement clinker in cement kilns, also involves high temperature burning. While liquid wastes have in the past been burned in cement kilns, no effort has been made to employ cement production in conjunction with the destruction of highly hazardous solid or semi-solid contaminants. The reason is that while liquid waste can be fired using conventional oil burners similar to fuel oil burners, no technology for introducing solid or semi-solid hazardous waste into the burning zone of rotary kilns has been available. The scope of the present invention is to provide such a technology.

In this regard, the incinerating of liquid contaminants in cement kilns has been as much for the purpose of obtaining inexpensive fuel for the kiln. Thus a cement kiln operator may be willing to actually pay for contaminated oil or the like.

The burning of liquid organic hazardous wastes allows for the recovery of substantial amounts of energy from waste materials. The production of cement is a highly energy intensive process. Energy costs generally account for 33 to 40 percent of the cost of producing clinker. Waste fuels typically have a heat content comparable to coal. By injecting liquid organic wastes into the kiln as a supplemental fuel, cement kilns may greatly reduce their use of primary fuels, thus providing substantial savings to the manufacturer.

The present status of hazardous waste incineration in cement kilns is that only liquid waste is burned in the firing end of the kiln. Most of the kilns burning liquid waste are wet process kilns, at least in the United States. The reason is presumably that wet process kilns are particularly fuel inefficient, for which reason operators of wet kilns have been strongly motivated to find ways to lower their fuel bill. Another reason is that wet kilns can accept high inputs of chloride without expensive modifications (up to 0.8% Cl on clinker basis), whereas dry process kilns with 4-stage preheaters are limited to a chloride input of 0.015% (precalciner kilns) to 0.023% (preheater kilns) on clinker basis. If the chloride input exceeds these figures, the kilns will have to be equipped with costly by-pass installations which in the most extreme case (a precalciner kiln with 100% by-pass for kiln tube gas) will permit a total chloride input of about 0.8% Cl on clinker basis.

Figure 1A:
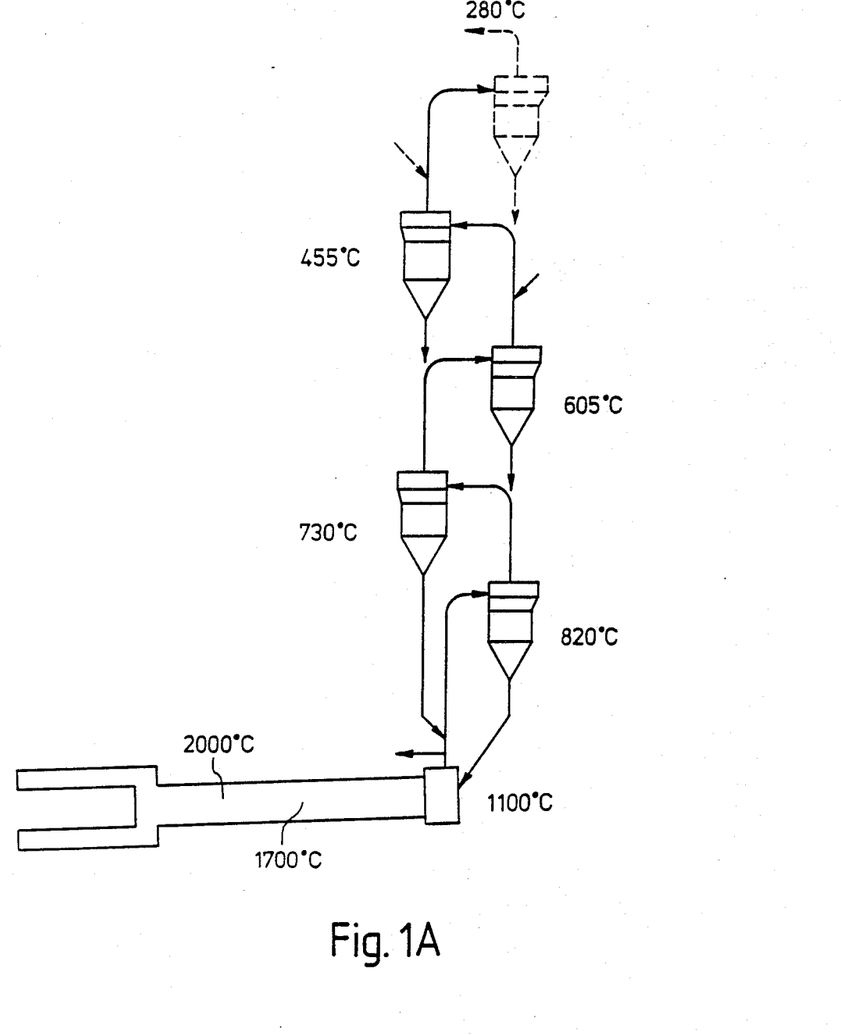
FIG. 1A is a schematic of a typical suspension preheater cement rotary kiln system showing the various temperature zones contained therein.
Figure 1B:
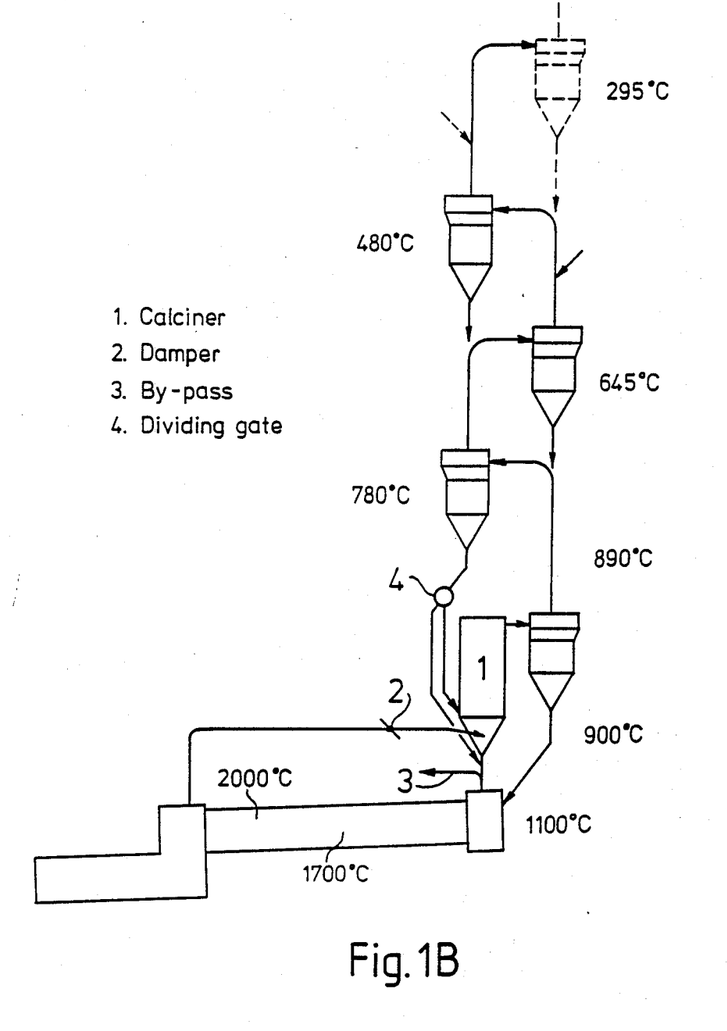
FIG. 1B is a schematic of a typical precalciner cement rotary kiln system, also showing the various temperature zones.

The gas exit temperature from the kiln tube typically is about 1100° C., which however drops to 820° C. (preheater kilns) or 900° C. (precalciner kilns) a few tenths of a second after the gas leaves the kiln tube (see FIG. 1) when raw meal is introduced into the stream of kiln gas. The gas taken out through the by-pass is quenched with cold air to even lower temperatures to permit the handling of the by-pass gas.

For this reason it is not possible to introduce chlorinated waste into the back end of preheater kilns, or to fire it into a precalciner since a temperature of at least 1200° C. at 2 seconds gas retention time is required. Non-chlorinated solvents (as for instance turpentine, xylenole, etc.) may be burned in precalciners or introduced into the back end of preheater kilns without problems, and non-chlorinated solid waste may be used in the same way. It has for some years been common to introduce automobile tires in the back end of preheater kilns where they burn without problems.

Cement kilns have the potential to dispose of large volumes of organic waste. For example, by replacing 35 percent of its coal consumption by burning waste fuels, a typical cement kiln could burn on the order of 100 tons of hazardous wastes per day. Such substitution rates have been achieved with liquid organic waste.

The situation changes drastically, however, when solid or semi-solid residues are concerned. With respect to these, companies may be required to pay ransom amounts to have them removed and destroyed in an environmentally acceptable manor. The lack of a heretofore available effective and low cost means of disposing of such wastes has resulted not only in high removal and treatment costs, but in unsafe or illegal dumping with almost incalculable damage to the environment.

SUMMARY OF THE INVENTION

In accordance with the invention, it has been found that the safe and inexpensive destruction of even the most toxic and most stable solid and semi-solid hazardous waste products is possible. Such destruction is uniquely accomplished in conjunction with cement production in cement kilns. Furthermore, the modification of existing cement kilns to accept such hazardous waste will require a relatively small capital investment.

In comparison to other types of hazardous waste incinerators, cement kilns possess several characteristics which make them an efficient technology for destroying highly toxic and stable organic wastes. These characteristics include the following:

(a) Combustion gas temperatures and residence times in cement kilns exceed those generally experienced in commercial hazardous waste incinerators. These high combustion temperatures and long residence times, along with the strong turbulence encountered in cement kilns, virtually assure the complete destruction of even the most stable organic compounds.

(b) Due to the large size and amount of heated material in cement kilns, these kilns exhibit high thermal stability. In other words, temperatures within the kiln change very slowly. Thus, even if a cement kiln is forced into an emergency shutdown resulting from a loss of primary fuel or severe upset, all hazardous waste in the kiln should be completely destroyed, provided that automatic cutoffs prevent further injection of wastes.

(c) Cement kilns operate under alkaline conditions. Therefore, virtually all of the chlorine entering the kiln is neutralized to form calcium chloride, sodium chloride and potassium chloride, all relatively non-toxic substances. Consequently, emissions of hydrogen chloride, a strongly acidic compound, are significantly lower than emissions from commercial hazardous waste incinerators.

(d) Bottom ash resulting from the incineration process is incorporated into the clinker product, eliminating bottom ash disposal problems. Any metals contained in bottom ash are incorporated into the cement product in an inert form. Furthermore, cement quality is relatively insensitive to the addition of most impurities found in hazardous wastes and waste oils.

In order to burn chlorinated waste in a cement kiln, it must be introduced at a place where sufficient temperature and retention time can be secured. The only such place is the burning zone of the kiln.

All cement kilns have a coating of clinker on the bricks in the burning zone which usually extends 6 kiln diameters from the clinker outlet. In the burning zone the flame temperature is about 2000° C. (3600° F.) and at the upstream (from a material standpoint) end of the coating the gas temperature is about 1700° C. and may be as high as about 1800° C. (3270° F.).

About 2 kiln diameters further up the kiln there will be little or no coating on the bricks, and the gas temperature will still be 1600°-1700° C. (2910°-3090° F.). This has been discovered to be an ideal place to introduce solid or semi-solid waste. For example, such waste could be introduced into the burning zone in steel drums since there would be sufficient temperature and time to destroy even the most difficult chlorinated waste and to burn the drums completely to iron oxide.

BRIEF DESCRIPTION OF THE DRAWINGS

For a better understanding of the invention, reference may be made to the following description of the exemplary embodiments taken in conjunction with the figures of the accompanying drawings, in which.

DESCRIPTION OF THE PREFERRED EMBODIMENTS

According to the present invention, five exemplary techniques are contemplated for the introduction of solid and semi-solid (pasty, greasy, sludge) waste into the burning zone of a rotary cement kiln.

A. Side Intake

A side intake is fitted to the kiln shell about 8 internal kiln diameters from the clinker outlet. The intake could, for example, be based on planetary cooler inlets, turned 90 degrees and facing in the direction of rotation of the kiln. The elbow (or elbows) may be extended with a curved pipe concentric with the kiln shell, with a suitable sluicing arrangement. With this arrangement, the inlets are charged on the rotationally rising side of the kiln whereby the waste is scooped into the kiln.

Alternatively, the intake might also be in the shape of a cyclone inlet with the opening facing into the direction of rotation of the kiln. Extender pipes with sluices may be incorporated into this design. If whole drums are to be introduced, their size must be adapted to the heat value and combustion velocity of the waste.

B. Ballistic Introduction from Firing End or Back End

As an alternative it is possible to use a device that can shoot whole drums or smaller canisters filled with solid/semi-solid waste into the burning zone of the kiln. Technically it is possible to shoot 55 gallon drums into the kiln, but heat value and/or combustion rate of the waste may be too high for such large doses in which case smaller canisters must be used. The waste generator may have to pack the waste in such special containers if repacking at the cement plant is to be avoided.

C. Pneumatic Injection from Firing End

In order to obtain a continuous feeding of waste into the burning zone of the kiln, similar to the continuous feeding of liquid waste through atomizing burners, it will in many cases be possible to transform waste in solid, pasty or sludge form into a non-sticky product by mixing it in a suitable mixer or pug mill with coal dust, precipitator dust, raw meal or finished product. The resulting granular product can if necessary be reduced to smaller granules by passing the material through a cage mill or other suitable desintegrator. The resulting product is then pneumatically injected into the burning zone of the kiln in a continuous stream.

D. Shredded Drum Followed by Pneumatic Injection

Rather than introduce whole drums containing solid or semi-solid waste (i.e. as in B above), the drums may be shredded outside of the kiln and the metal fragments separated from the waste. The waste may, if necessary, be mixed with a suitable mixer as in C to form a non-sticky product. The metal fragments may be cleaned with a suitable detergent solution and the resulting contaminated solution may be similarly converted into a non-sticky product. The cleaned metal may then be recycled.

E. Gasification Prior to Injection

It is always preferred that fuel be provided to the kiln in as even or steady flow as possible. Discontinuous introduction represents the danger of getting temporary puffs of unburnt fuel unless a very large air excess is maintained or the individual doses of fuel are small. When burning automobile tires in a dry process preheater cement kiln, for example, it has thus far not been possible to substitute more than 15% of the total fuel used by this kind of lumpy solid waste.

Another problem with intermittent introduction of solid fuel is that most of it will inevitably end in the material charge in the kiln where it will burn. This will tend to reduce ferric oxide $Fe_2O_3$ in the clinker to $FeO$ which usually results in an inferior clinker product. The reducing conditions further decompose alkali- and calcium sulphate to oxides and $SO_2$ which usually leads to serious operating problems on preheater kilns and to $SO_2$ emission on other kiln types.

Hence a further embodiment of the present invention comprises gasifying the solid or semi-solid waste prior to injecting the gas into the kiln. The gasification may be accomplished in a conventional gasifier such as is used for coal gasification or the like.

Before discussing the exemplary embodiments, reference is first made to FIGS. 1A and 1B. As to these Figures, and as noted above, the rotary kiln typically has a gas exit temperature of about 1100° C. Downstream (again from a material standpoint) of the gas exit the temperature is substantially higher, e.g., 2000° C. in the burning zone and 1700° C. or higher at the upstream end of the coating. In order to destroy the waste according to the invention, it is preferred that the burning zone be maintained at a gas temperature of at least 1500° C.

Figure 2:
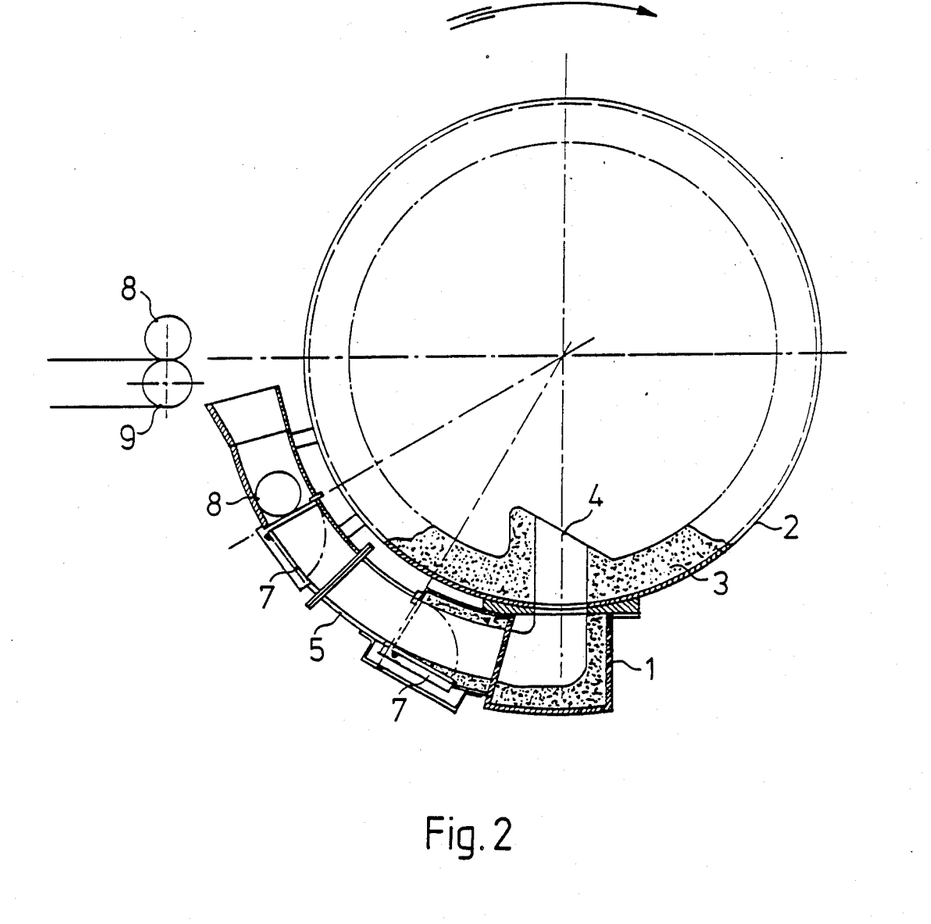
FIG. 2 is a schematic of an embodiment of the invention wherein the waste is introduced into the kiln through a side intake.

With reference to the first embodiment A, and looking to FIG. 2, there is shown a schematic representation of a side intake 1 fixed to the shell of a rotary kiln which is lined with refractory 3. The side intake is placed on the kiln shell sufficiently far above the clinker outlet that there is no coating of sintered material on the refractory. The side intake connects with the interior of the kiln through a hole 4 through kiln shell and refractory, and the side intake is further provided with an elongated inlet tube which follows the curvature of the kiln shell for up to 360°. The elongated inlet tube 5 is further provided with at least 2 sluicing arrangements 7 which function partly as an air seal to prevent false air from being sucked in and hot kiln gas to escape by thermal up-draught. The latter phenomenon can also be prevented by extending the curved inlet part along the entire or most of the circumference of the kiln shell. The drums or canisters with waste 8 are conveyed and metered to the inlet tube by means of the feeding device 9 which feeds a predetermined number of drums to the intake for each kiln revolution. The inlet sluices 7 are activated alternatingly and can also be used as a means to feed the drums 8 one by one in case the feeder 9 dispenses more than one drum per kiln revolution.

Figure 3:
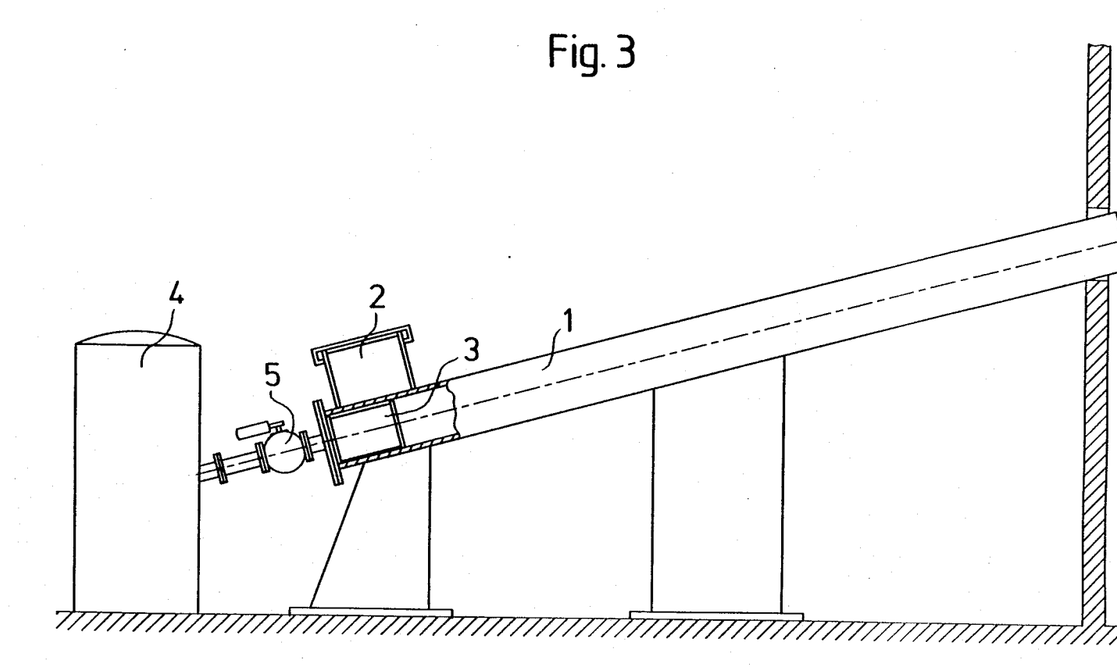
FIG. 3 is a schematic of a ballistic launcher which can be fitted to either the back end or firing end of the kiln shown in FIG. 1.

FIG. 3 outlines the principle of a pneumatic gun with a barrel 1, a loading arrangement 2 through which canisters 3 with waste are placed in the barrel. The canisters can either be placed directly in the barrel or in a sledge with an open front. The propellent for the gun can be compressed air from an air receiver 4 and the charge in the barrel is propelled out through the barrel by quickly opening the valve 5. If a sledge is used there will be a sledge brake near the muzzle of the barrel. The accelerating device is typically placed on the burners platform with a suitable elevation of the barrel. The canisters will normally be thrown into the kiln through an opening in the lower part of the kiln hood. The accelerating device may also be a purely mechanical catapult, an electro-mechanical device or be based upon a combination of electric, pneumatic and mechanical principles.

Figure 4:
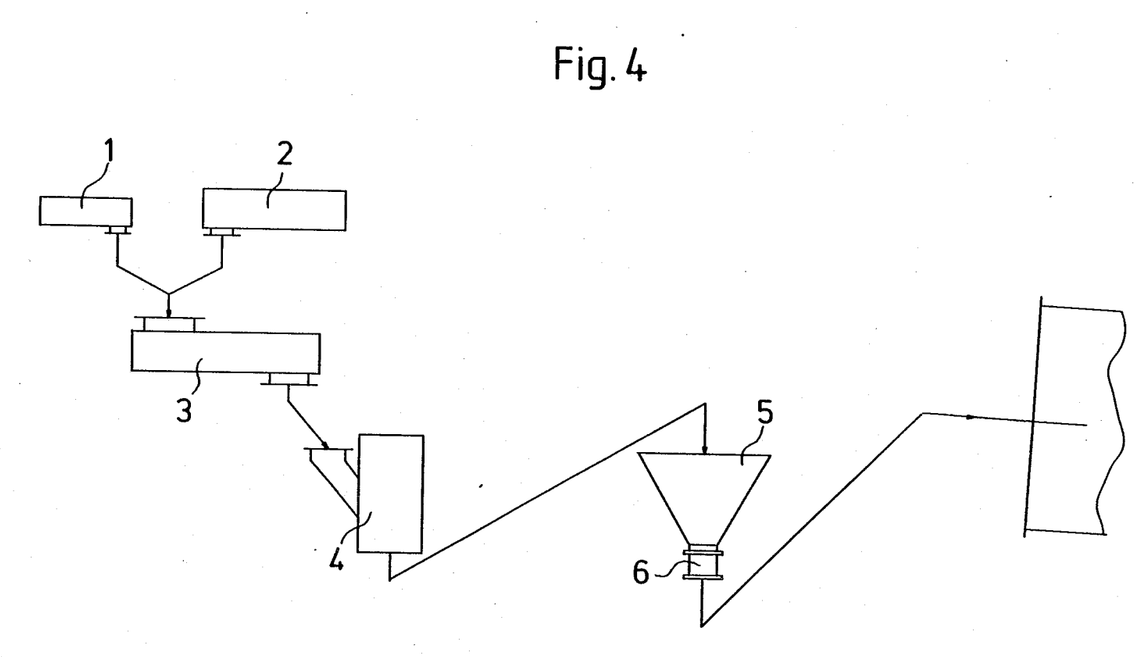
FIG. 4 is a schematic of an arrangement for premixing the waste with powder or granular material to form a non-sticky product which may then be pneumatically injected into the burning zone of the kiln in a continuous stream.

FIG. 4 is a schematic representation of a plant consisting of feeders 1 and 2 for waste and a carrier substance (coal meal, filter dust, kiln feed, finished product), respectively. There is a pugmill 3 in which the two substances are mixed and a cage mill 4 for disintegrating the mixed product. The material from the cage mill may be stored in a hopper 5. From this hopper the mixture is measured out by means of the feeding device 6 and conveyed pneumatically directly into the kiln.

Figure 5:
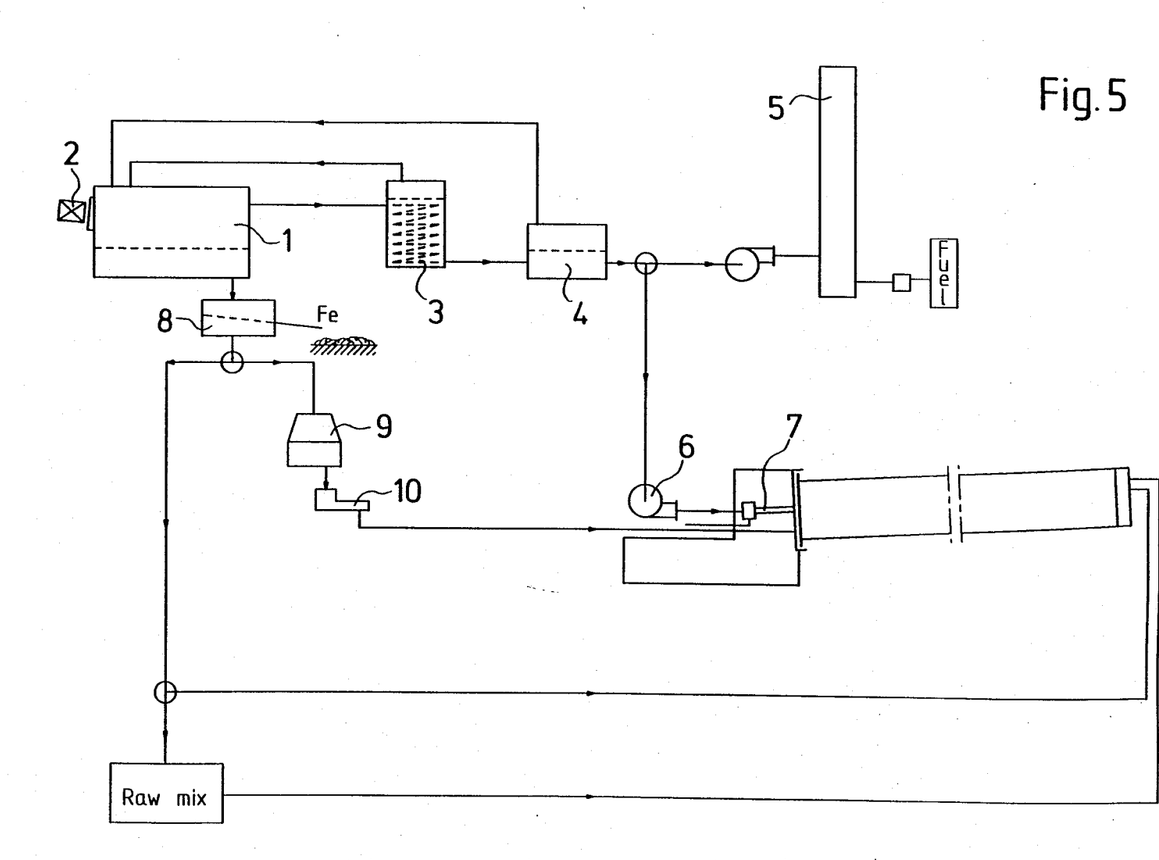
FIG. 5 is a schematic of an arrangement whereby the waste is gasified in a gasifier prior to being introduced into the burning zone of the kiln.

FIG. 5 depicts an apparatus for the pre-gasification of the hazardous waste. As noted above, the proposed technique for converting the waste into a state that permits continuous feeding is to gasify it in a gasifier of the type used for coal. The gasifying medium could be air or stream or a mixture of both. The resulting gas will contain nitrogen, $CO_2$, $CO$, $H_2$, hydrocarbons, and various other organic gases and vapors. Its composition will of course depend upon the type of the waste and the air→:→steam ratio in the medium used for gasification. It will in many ways be very similar to the gas from coal gasification carried out in similar equipment under similar conditions, and like the coal gas it will be highly toxic.

The waste gas is sent directly the burning zone of the rotary kiln where it is burned off in the flame. The temperature and retention time in the burning zone will be more than adequate to destroy completely any hazardous components contained in the gas. Depending upon the composition and heat value of the gas, it may be used as the only fuel in the kiln, or it may be used in combination firing with other fuels.

The residue from the gasification of the waste will consist of the inorganic ash as well as small amounts of carbon in the form of graphite. Since the gasifier operates at about 1000° C. there is no possibility of the ash containing any other organic material than graphite. All other organic substances will either have evaporated or been decomposed, and are thus present in the gas.

The ash, which has a chemical composition rather similar to clay, is used as a clay component either in the raw feed preparation plant, or it is fed directly into the feed end of the kiln. Its content or graphite is of no consequence and the graphite will later burn in the cement kiln at about 800° C. and its heat content will be utilized. Alternatively, the ash may be blown directly into the burning zone of the rotary kiln by means of a pneumatic pump. In any event, the ash is efficiently consumed in the cement clinkering process and need not be disposed of separately.

Looking to FIG. 5, hazardous waste in solid, pasty, greasy, or sludge form is introduced into the gasifier 1, for instance in the form of shredded drums 2. The resulting gas is cooled in a waste heat boiler 3, which generates steam for the gasification. A heat exchanger 4 that supplies preheated air to the gasifier is placed after the boiler. In case the gas consumption is suddenly suspended, a burn-off tower 5 is provided which is further provided with an auxiliary fuel supply.

By means of the fan 6 the gas is blown to the main burner 7 of the rotary kiln. The ash from the gasifier is separated in a magnetic separator 8 to remove fragments of shredded drums, and sent either to the raw mix preparation plant or directly to the feed end of the kiln. Alternatively, the ash may be pulverized in the pulverizer 9 and blown directly into the burning zone by means of the pneumatic pump 10.

Figure 6:
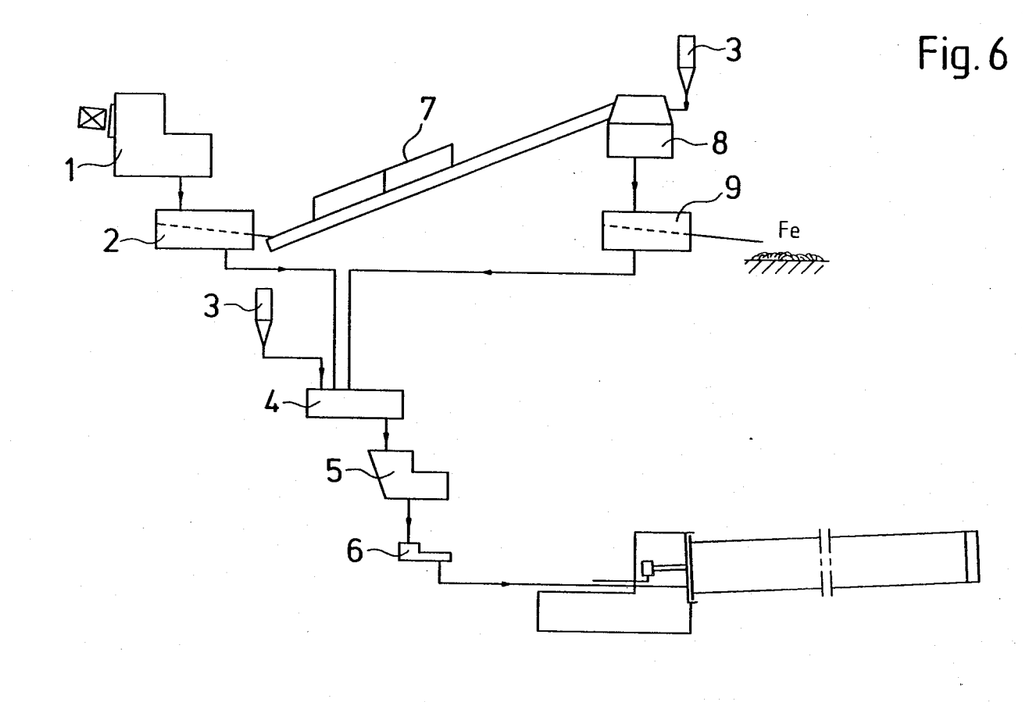
FIG. 6 is a schematic of an arrangement for shredding drums containing solid or semi-solid waste prior to introducing the waste into the kiln.

FIG. 6 depicts an apparatus for shredding the waste-containing steel drums prior to introducing the waste into the kiln. It will be appreciated that certain waste, particularly semi-solid and/or sticky wastes are typically collected in steel drums (e.g. 55 gallon drums). Also, while it is contemplated according to the invention to introduce intact waste-containing steel drums directly into the kiln, this is not the most preferred embodiment since it is always better to provide combustible material in a continuous closely controlled manner.

Thus there is provided a technique which permits the continuous introduction of solid or semi-solid waste, which is received at the kiln facility in steel drums, into the burning zone of a rotary kiln without having to first remove it from the drums. The material is assumed to be so soft or sticky that it cannot be pulverized in the machines typically used to pulverize coal into a fine powder without some kind of pretreatment.

According to the invention, the drum with its contents is passed through a heavy duty shredder which shreds the drum into small fragments. If the drums are made of plastic, fibreboard or other organic material there is no reason to attempt to remove the fragments. On the other hand, if the drums are made from steel, the fragments can with advantage be removed from the shredded product by means of a magnetic separator.

The waste product from which the steel fragments have been removed by magnetic separation is in most cases too sticky to permit it being transformed into a powdery or granular product by standard comminution equipment such as impact mills, ball mills or vertical roller mills. For this reason the waste will have to be mixed with a powdery or granular product, preferably with absorbing properties. Such a material could be raw kiln feed, pulverized kiln product, coal powder, wood powder or any other material which can be introduced into the kiln without harming the properties of the material being processed in the kiln. The mixing can be performed in any standard mixer for solid materials, such as a pug mill or a double shaft paddle mixture.

The steel fragments from the shredded drums can be recycled as scrap metal, but in most instances only after they have been cleaned before sending them to a steel works for remelting. The cleaning is envisaged to take place by spraying the steel fragments with a detergent solution, transferring the fragments to an agitating device such as a rotating drum where there is added the same type of granular or powdery material used for mixing with the bulk of the hazardous waste. After the treatment in the agitating device the steel fragments will have been freed of most of the adhering hazardous waste and they may be recovered by screening or magnetic separation. The remaining material may then be added to the mixer together with the bulk of the waste and the powdery material referred to above.

Looking to FIG. 6, drums containing hazardous waste are fed to the shredder 1. The product from the shredder is conveyed to the magnetic separator 2 where fragments of steel drums are removed. The waste without steel fragments is mixed with dry absorbent 3 in the mixer 4 from where it is conveyed to the disintegrator 5 and blown directly into the burning zone of the rotary kiln by means of the pneumatic pump 6.

The steel scrap is sprayed with detergent solution 7 and sent to the agitating device 8 where dry absorbent 3 is added. After the agitating device the steel fragments are once more removed by means of the separator 9 and the non-metallic fraction is returned to the mixer 4.

I claim:

1. A method of destroying hazardous organic waste material in solid, pasty, greasy or sludge form including the steps of maintaining a burning zone in a rotary kiln at a gas temperature of at least 1500° C., introducing the waste directly into the burning zone, simultaneously burning the waste together with cement, lime or lightweight aggregate in the kiln so as to form a gaseous combustion product and an environmentally acceptable clinker product, maintaining the gaseous combustion product at a temperature of at least 1200° C. for a period of at least two seconds, and removing the clinker product from the kiln.

2. A method according to claim 1, including the step of introducing the waste through at least one opening in the side of the kiln shell substantially adjacent to said burning zone.

3. A method according to claim 1, including the step of introducing the waste ballistically through the firing end or the back end of the kiln with sufficient velocity as to cause the waste to be introduced directly to but not substantially beyond said burning zone.

4. A method according to claim 3, including the step of encapsulating the waste in canisters before introducing the waste into the burning zone.

5. A method according to claim 3, wherein the canisters are in the form of steel drums.

6. A method according to claim 1, including the steps of mixing the hazardous waste with a powder or granular material in order to improve the handling characteristics of the waste without substantially damaging the quality of the clinker product, and thereafter introducing the mixture of waste and powder or granular material into said burning zone.

7. A method according to claim 6, wherein said powder or granular material is at least one of the materials selected from the group consisting of coal, coal dust, precipitator dust, raw meal and finished clinker product.

8. A method according to claim 6, wherein said mixture is injected pneumatically in a continuous stream into said burning zone.

9. A method according to claim 8, wherein said mixture is injected through the firing end of the kiln.

10. A method according to claim 1, including the steps of gasifying the waste in a gasifier prior to introducing the waste into the kiln, introducing the gasified waste into said burning zone, burning the gas in the burning zone of the rotary kiln and incorporating any ash from the gasifier in the rotary kiln product, either by introducing it through the normal feeding system of the kiln or pneumatically into the burning zone of the kiln.

11. A method according to claim 1, including the steps of first passing steel drums containing the waste through a shredder so as to create a mixture of steel fragments and waste material, removing the steel fragments from the mixture by means of a separator, mixing the remaining hazardous waste with a powder or granular material in order to improve the handling characteristics of the waste without substantially damaging the quality of the clinker product, and thereafter introducing the mixture of waste and powder or granular material into said burning zone.

12. A method according to claim 11, including the steps of treating the steel fragments from the separator with a detergent solution, transferring the treated fragments to an agitating device, adding granular or powder absorbent material to the agitating device and causing the absorbent material to clean the fragments by absorbing the detergent solution, separating the cleaned steel fragments from the absorbent material, and passing the solution-containing absorbent material to the kiln together with the mixture of waste and powder or granular material.

13. A method according to claim 1, wherein said waste contains at least one hazardous material selected from the group consisting of PCB, dioxin, DDT and residue from the production of polyvinyl halogenides.

* * * * *